United States Patent [19]

Bellmann et al.

[11] Patent Number: 4,545,107
[45] Date of Patent: Oct. 8, 1985

[54] TOOL CARRYING MAGAZINE FOR A TOOL HANDLING MACHINE

[75] Inventors: Bernhard G. Bellmann, Laudenbach; Horst W. Birkner, Karlsruhe; Theo Kaminsky, Pfungstadt, all of Fed. Rep. of Germany

[73] Assignee: Santrade Ltd., Lucerne, Switzerland

[21] Appl. No.: 284,463

[22] Filed: Jul. 17, 1981

[30] Foreign Application Priority Data

Jul. 19, 1980 [DE] Fed. Rep. of Germany ....... 3027460
Mar. 17, 1981 [DE] Fed. Rep. of Germany ....... 3110307

[51] Int. Cl.⁴ ............................................. B23Q 3/155
[52] U.S. Cl. ...................................... 29/568; 198/728; 198/740; 198/744
[58] Field of Search ....................... 29/568, 33 P, 563; 198/740, 741, 742, 744, 728, 448; 407/114

[56] References Cited

U.S. PATENT DOCUMENTS

| | | | |
|---|---|---|---|
| 3,355,797 | 12/1967 | Lohneis | 29/568 |
| 3,726,001 | 4/1973 | Anderson et al. | 29/568 |
| 3,779,391 | 12/1973 | Sato et al. | |
| 3,793,708 | 2/1974 | Watanabe et al. | 29/568 |
| 3,851,380 | 12/1974 | Kurimoto et al. | |
| 4,248,553 | 2/1981 | Kraemer | 407/114 |

FOREIGN PATENT DOCUMENTS 2524098 5/1975 Fed. Rep. of Germany .
1428357 3/1976 United Kingdom .

*Primary Examiner*—Z. R. Bilinsky
*Attorney, Agent, or Firm*—Burns, Doane, Swecker & Mathis

[57] ABSTRACT

A tool magazine of a tool handling machine which carries several similar tools comprises a unit which can be removed from the tool machine. The tools are conducted between guide rails in a lengthwise shiftable manner. The lengthwise feed of the tools in the tool magazine takes place by means of a feed comb whose comb teeth are moved transversely into engagement between the individual tools. The feed comb carries out a driven feed movement in a lengthwise direction of the magazine. The tools are moved from the tool magazine by a tool gripping device and conducted to a tool fixture of the tool machine. Conversely, the expended tools are moved into the tool magazine by a tool gripping device.

26 Claims, 28 Drawing Figures

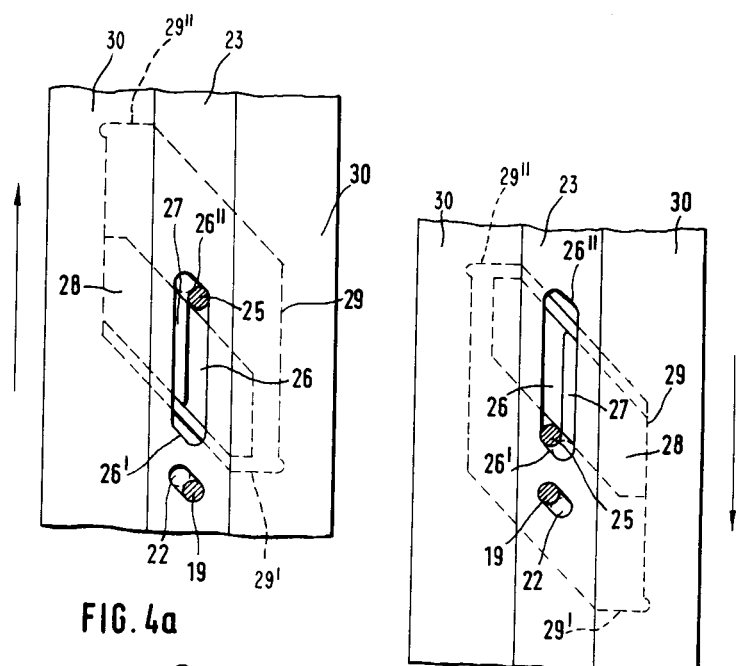
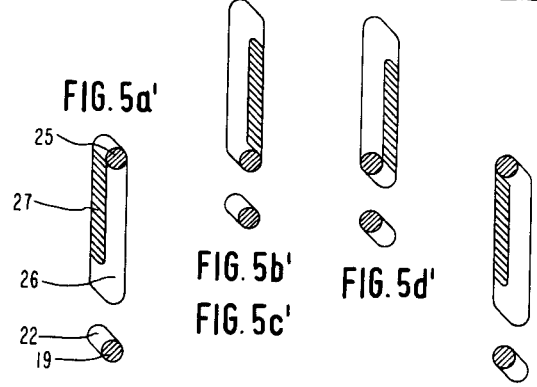

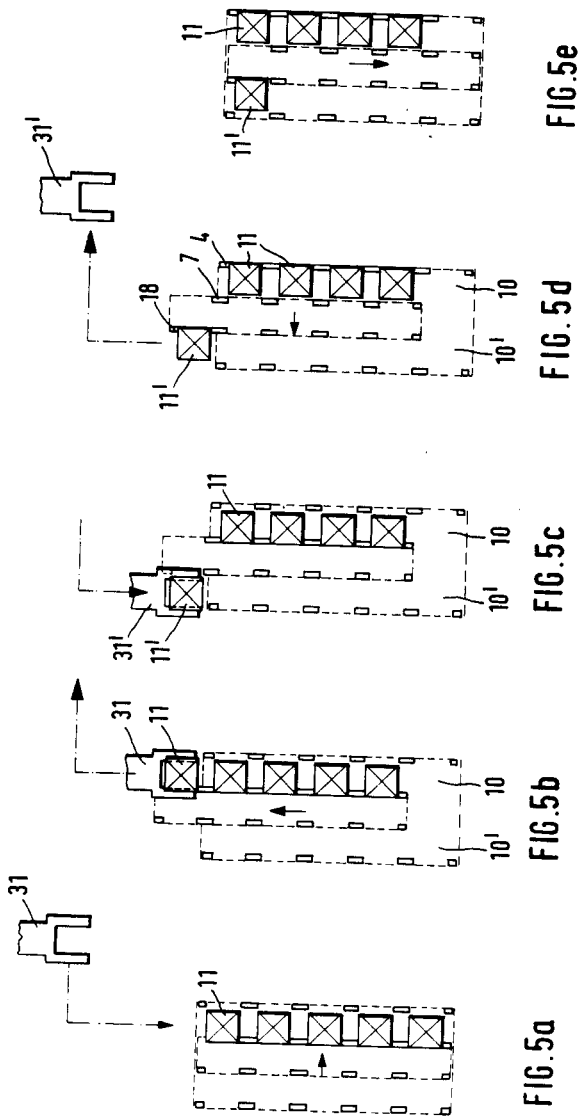

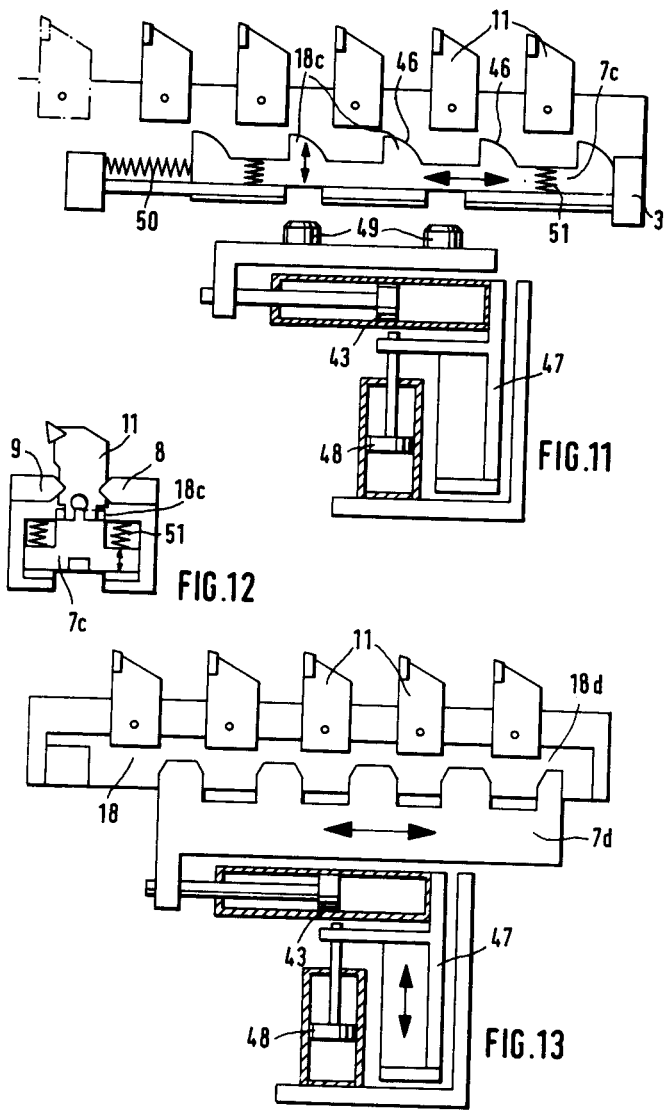

U.S. Patent   Oct. 8, 1985   Sheet 7 of 7   4,545,107
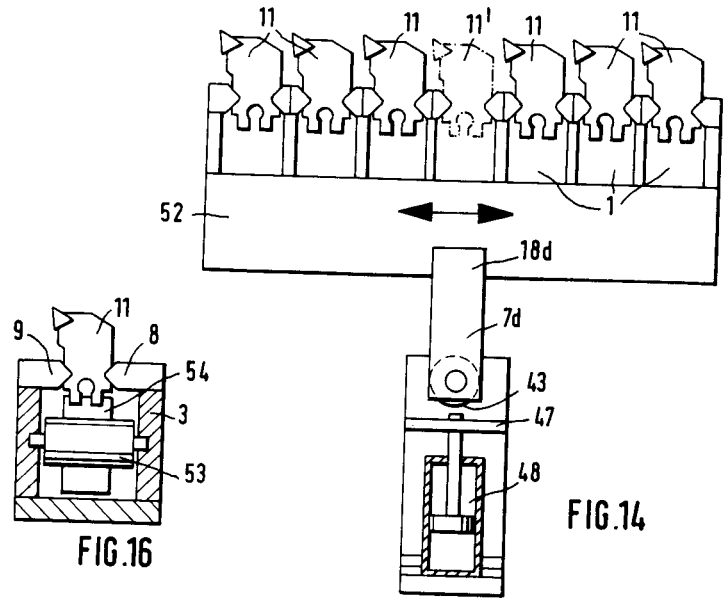
FIG.14
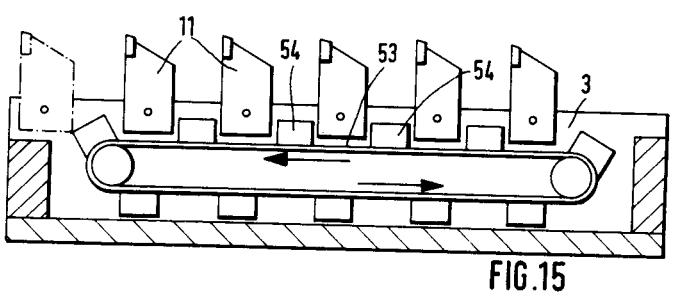
FIG.16
FIG.15
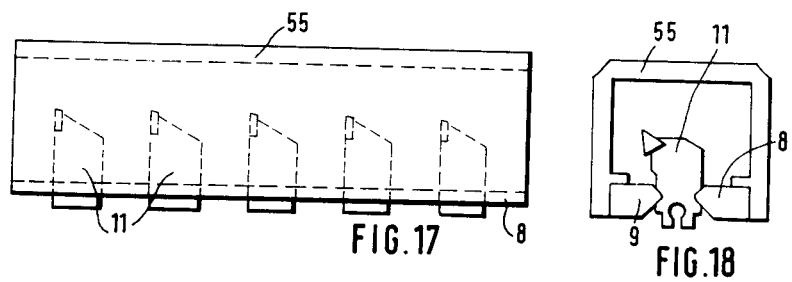
FIG.17
FIG.18

TOOL CARRYING MAGAZINE FOR A TOOL HANDLING MACHINE

BACKGROUND AND OBJECTS OF THE INVENTION

The invention concerns a tool-magazine mechanism for a tool machine in which at least one tool magazine carries several tools. A tool gripping device individually receives the tools from the tool magazine and transports them to a tool mounting fixture for the tool machine.

Tool-magazine mechanisms are especially known on numerically controlled tool machines in many design forms. Their purpose is to keep several, different tools ready for an automatically controlled tool exchange.

It is common to all magazine devices for the type mentioned at the outset that each of the tools carried in the magazine mechanism can be taken over directly by the tool gripping device. In order to achieve this, the tool magazine is usually arranged movably on the tool machine, for example in a swivelable manner and/or transportable, so that each individual tool storage position of the magazine can be brought into a position accessible to the tool gripping device. Either the tools and/or the storage positions assigned to them are coded, so that the selection of the tools to be taken over by the tool gripping device can take place automatically by a control mechanism.

The requirement is increasingly made in manufacturing techniques to control machine tools automatically over long periods of time, without the intervention of operating personnel being required. This requirement results especially from the effort to automatically operate tool machines in a controlled manner in manufacture during a work shift, especially the night shift.

Achieving of this desire is complicated by the fact that the tool service life, that is to say the time between two successive tool changes in most cases, is much less than the length of a working shift, and indeed primarily it is determined by tool wear.

There are different possibilities for monitoring the service life of tools, for example by a direct wear measurement on the tool, or by a running tool control, or by cutting force measurements during the processing procedures. If it is determined in this manner that a tool change is required, up to now, in most cases, the tool machine is maintained stationary and a signal is given, which shows an operational or monitoring person that a tool change must be made.

The possibilities for an automatic tool change were very limited by the design characteristics of the known tools and tool magazines. Basically, it was possible to carry the tools in several storage positions of the tool magazine, which could be used in succession. The effort for coding, control and monitoring, however, was relatively high, since every individual tool or every individual storage position in the tool magazine had to be coded. Moreover, in many cases, the capacity of conventional tool magazines does not suffice for conducting the worn-out tools back into the tool magazine.

If the coding is limited to individual storage positions of the tool magazine, the danger exists that the correctly coded storage position might be equipped with the wrong tool, the use of which could lead to serious damage. On the other hand, if each individual tool was coded, then it could be determined before the use of the tool whether the coding present on the tool corresponds with the tool coding actually required for control. However, coding of each individual tool proves to be all the more difficult and expensive, the less room there is available for this on the tool. On the other hand, for several reasons, the effort is being made to keep the tools to be exchanged as small as possible and to keep their design as simple as possible. However, these efforts are contrasted with the necessity of coding each individual tool.

On conventional tool-magazine mechanisms on tool machines, the change-over for machining another workpiece involves great effort, because in general all tools present on the tool magazine must be removed and the tool magazine must be reloaded, due to which a relatively long shutdown time of the machine is caused. In the given case, a coding of the individual storage places of the tool magazine on the tool machine must take place due to which the required time expenditure is greatly increased.

Thus, it is the object of the invention to create a tool-magazine mechanism of the type named at the outset, which makes possible a simple tool change with little design effort and work expenditure, and without the intervention of operational personnel with the automated production work cycle, and which provides a rapid and simple change-over for the machining of different tools.

This object is solved according to the invention by the fact that the tool magazine is a separate constructional unit which can be removed from the tool machine, and that several similar tools can be carried in the tool magazine and shifted lengthwise by means of a driven feed mechanism. Thus, the entire magazine mechanism of the tool machine exhibits one or preferably several individually removable tool magazines. Since all tool magazines can be removed individually, several similar tools can be exchanged in a simple manner with a change-over to machining, without it being necessary to remove the tools individually from the magazine storage places and to re-equip the magazine. The machine design is essentially simplified by the fact that all magazine storage positions are no longer attainable for the tool gripping device nor do they need to be moved into the access area of the tool gripping device. Since the individual tools can be shifted longitudinally in each of the tool magazines, it is sufficient for each tool magazine which contains similar tools to provide an individual delivery place on the tool gripping device, without a movability of the tool magazine being required.

In especially advantageous designs of the concept of the invention, it is provided that each tool magazine exhibits a coding carrier, the coding of which identifies the tools. The coding can be detected by a coding reader arranged on the magazine receiving fixture of the tool machine and can be conducted to a control mechanism. In this way, a substantial increase of work safety is achieved with automated operating cycle, because neither a coding of each individual tool is required nor a coding of the magazine storage positions on the machine. Rather, it is sufficient to code the tool magazine carrying the individual tools or several tools of the same kind which can be used arbitrarily in the coded permanent receiving places on the machine. The coding of the individual tool magazines takes place outside of the tool machine in the framework of production preparation and therefore can be carried out without time pressure and with great reliability, due to the possibility of controls. The required shutdown times of the tool machine are substantially reduced, especially with the change-over for other workpieces, because it is no longer necessary to equip individual magazine storage positions, since only the individual complete tool magazines must be exchanged.

Even if the tool magazines are used in other than the provided arrangement and sequence, working errors of the tool machine are ruled out, because the coding readers arranged on the magazine receiving places obtain information about such use and identify to the control which tools are available on the concerned magazine uptake places. The control device then can appropriately control the movement of the tool gripping device or the magazine fixtures.

In an especially simplified design form of the invention, it is provided that the feed mechanism exhibits at least one feed comb which can be shifted lengthwise in the tool magazine, whose comb teeth can be moved in and out of mesh between the individual tools arranged in the lengthwise guide track transverse to the lengthwise guide track. At the same time, the feed comb transports all tools and thereby maintains their mutual correlation.

Advantageously, a stop comb can be shifted in the tool magazine only transverse to the lengthwise guide track, whose comb teeth are actually movable in and out of engagement between the tools arranged in the lengthwise guide track. This stop comb makes sure that the mutual correlation of the individual tools taken-up in the lengthwise guide track is maintained reliably even when the feed comb is out of mesh with the tools. There is also the transverse movement of the feed comb and of the stop comb preferably in synchronism.

An especially advantageous design is characterized by the fact that two parallel lengthwise guide tracks lying next to each other are provided in the tool magazine. While one of the two lengthwise guide tracks contains the new tools standing ready for the tool change, the actually used-up and replaced tools can be taken-up in the second lengthwise guide track. The transport process in each individual tool magazine is especially simple, because the shoving back of an expended tool corresponds to the shoving forward of a new tool. Thus, it is possible in a very simple design manner to connect both feed combs coordinated to both guide tracks with each other in a rigid manner and to drive them together.

The adherence of the intervals between the individual tools in those time intervals in which the feed comb is disengaged from the tools can also take place by spring-loaded stop mechanisms, which actually mesh with the individual tools. Then no stop comb is necessary. The feed comb can rest in the removable tool magazine or on at least one of the several magazine mounting places in the tool machine. When the feed comb rests in the tool magazine, the drive mechanism for the feed comb can rest either in each individual tool magazine or in turn, on at least one of several magazine mounting places of the tool machine.

Different movement cycles and drive types are possible for the movement of the comb teeth in and out of engagement with the tools. The feed comb can also be driven in a lengthwise movement and a transverse movement. When the comb teeth exhibit an abutting surface for the tools sloping in a common direction, and in transverse direction are supported in a spring-loaded manner either individually or in common, the transverse movement can be carried out automatically in the case of a withdrawal movement of the feed comb.

THE DRAWINGS

These objects and advantages of the invention will become apparent from the following detailed description of a preferred embodiment thereof, in connection with the accompanying drawings in which like numerals designate like elements, and in which:

FIGS. 4a, 4b show partial view in the direction of arrows IV—IV in FIG. 2, depicting the opposite ends of a stroke of a feed mechanism;

FIGS. 5a-5e show simplified top view on a tool magazine in successive work positions, where a tool gripping device is indicated, FIGS. 5'a-5'e schematically depict the relationship of feeding components which correspond to FIGS. 5a-5e;

FIGS. 7, 9, 11, 13 and 15 show different design forxs of tool magazines in simplified lengthwise cross-sections;

FIGS. 8, 10, 12, 14 and 16 show actually the front views of the magazines shown in FIGS. 7, 9, 11, 13 and 15, respectively;

FIG. 17 shows a portal-shaped tool magazine with tools carried therein; and

FIG. 18 shows a front view of the tool magazine according to FIG. 17.

DETAILED DESCRIPTION OF PREFERRED EMBODIMENTS OF THE INVENTION

Figure 1:
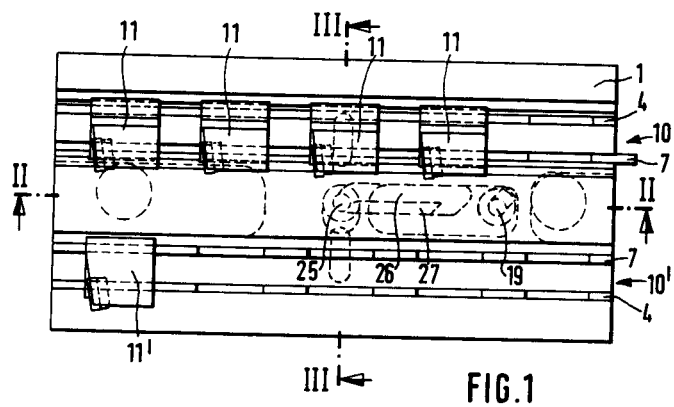
FIG. 1 shows a tool magazine with two lengthwise guide tracks in top view.
Figure 2:
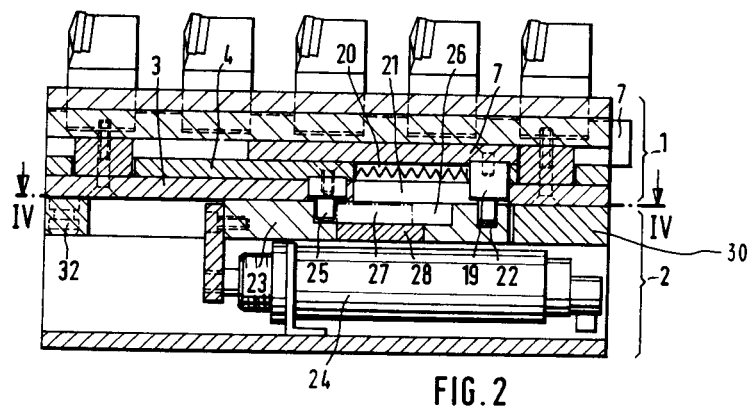
FIG. 2 shows a cross-section along line II—II in FIG. 1.
Figure 3:
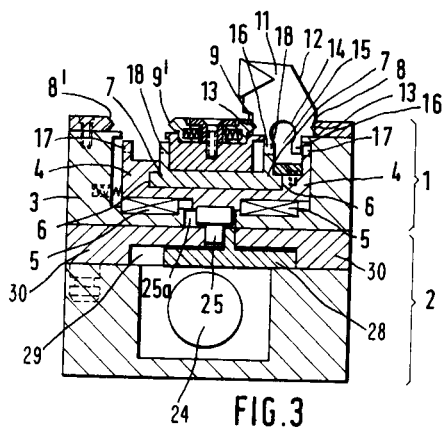
FIG. 3 shows a cross-section along line III—III in FIG. 1.

The tool magazine 1 shown in FIGS. 1-4 is arranged as a removable constructional unit on a tool magazine fixture 2 (FIG. 2) which forms a part of the tool machine. The tool magazine 1 includes a base 3 which is trough-shaped or U-shaped in cross-section (FIG. 3). A stop comb 4 is provided with parallel sets of feed teeth 17. The stop comb 4 is mounted in a transversely movable manner within the base 3 by means of keys 5 connected in the magazine base 3. A feed comb 7 includes parallel sets of teeth 18 connected with each other to form a U-shaped constructional part. The feed comb is mounted in a longitudinally movable manner in lengthwise guides 6 of the stop comb 4.

On the upper side of the tool magazine 1, two pairs of opposite lying guide rails 8, 9 or 8', 9' form two parallel guide tracks or paths 10, 10' for tools 11, 11'. With the shown design examples of tools 11, 11', we are dealing with turning tools with a relatively short chisel shaft 12, on which two guide grooves 13 are formed on the side, in which the guide rails 8, 9 or 8', 9' engage. Actually, the inner guide rails 9, 9' can be shifted in the transverse direction against a spring force, in order to enlarge the paths 10, 10' and release tools 11, 11', when these tools are to be removed from the tool magazine or inserted into them.

The tool shaft 12 exhibits a slot 15 widened to form a bore hole 14 on its rear end, which separates two flanges 16. The flange 16 of tools 11, 11' jut between teeth 17 of the stop comb 4 and between teeth 18 of the feed comb 7. Independent of the transverse movement position, the flanges 16 stand in mesh either with the teeth 18 of the feed comb 7 (as shown in FIG. 3) or with the teeth 17 of the stop comb 4.

The feed comb 7 is connected with a drive journal 19 (FIGS. 1, 2) which projects through a lengthwise slot 20 of the stop comb 4 and a lengthwise slot 21 of the base 3. The journal 19 extends from a locking groove 22 in a coulisse component part 23. The part 23 is guided in a movable manner in the magazine fixture 2 in the direction of the lengthwise guide track 10. The movement drive of the coulisse constructional part 23 takes place through a pressurized fluid-actuated piston-cylinder unit 24.

The stop comb 4 is connected with a drive journal 25 which projects through a transverse slot 25a in the base and is situated in a wide, lengthwise groove 26 of the coulisse constructional part 23. Thus, the journal 25 moves laterally but not lengthwise of the slot 26.

An upwardly projecting strip 27 of a deflecting slide valve 28 is arranged in a transversely movable manner in a laterally wide, lengthwise extending groove 26 of the coulisse constructional part 23. The deflecting slide valve 28 extends obliquely to the lengthwise direction of the magazine fixture 2 (FIGS. 4a, 4b) and has its ends disposed in a trapezoidal recess 29 of a base plate 30 fastened to the understructure. When the deflecting slide valve 28 is pushed by the part 23 against one of two guide surfaces 29' or 29" on the ends of the recess 29 at the end of a lengthwise stroke of the coulisse constructional part 23, the deflecting slide valve 28 is shifted to the right, due to the inclined face of the part 23 engaging the inclined face of the valve 28. Thus, the strip 27 is shifted either to the right or to the left in the lengthwise slot 26 (as shown in FIGS. 4a and 4b).

As is recognized especially clearly from FIGS. 4a and 4b, the lengthwise slot 26 is limited on both ends by guide surfaces 26' and 26" extending transverse to the feed direction and parallel to the locking groove 22.

Thus, as the part 23 begins its stroke, it causes the strip 27 to cam the journal 25 to the right or left. At the end of its stroke, the strip 27 itself is shifted to the right or left by the part 23. For example, in FIG. 4a, the part 23 is moving forwardly (arrow in FIG. 4a) and the strip (moved forwardly by the part 23) is in the process of shifting the journal 25 laterally (transversely) to the right. Thus, the feed combs 7 are brought into meshing engagement with the tools 11 (FIG. 3 and 5a). Further forward movement of the part 23 occurs relative to the journal 25, whereupon the strip 27 and slot travel beyond the journal 25. Thus, at the end of the forward stroke, the journal 25 lies beyond the rear end of the strip 27, enabling the strip to be displaced transversely by the part 23 and into lengthwise alignment with the journal 23 (FIG. 5'b). In FIG. 4b and 5'd, the part 23 has begun its rearward stroke and has cammed the previously aligned journal 25 to the left to disengage the feed comb from the tools 11 and engage the stop combs therewith (FIG. 5d).

In the case of the forward lengthwise shift of the coulisse component part 23, in the position according to FIG. 3 and 5'a, that is to say with the comb teeth 18 of the feed comb 7 shifted into engagement with the tools 11, the feed comb 7 is forwardly displaced by its drive journal 19 along a lengthwise movement. Accordingly, the frontmost tool 11 is pushed into a tool gripping device 31, as shown in FIG. 5b. The drive journal 19 thus approaches the journal 25. At the end of this forward stroke (FIG. 5'b), the tool gripping device 31 takes over the tool 11 and transports it into the tool fixture of the tool machine. At the same time, a second tool gripping device 31' takes over an expended tool 11' to be replaced, which it transports to the start of the second guide path 10' (FIG. 5c).

If now the movement direction of the piston-cylinder unit 24 is reversed, the deflecting slide valve 28, shifts the journal 25 to the left to the position shown in FIGS. 4b and 5'd. The stop comb 4 and the feed comb 7 are shifted to the left (FIG. 5d), whereby the tools 11 of the lengthwise guide track 10 mesh with the stop comb 4, so that the feed comb 7 disengages from these tools 11. At the same time, two comb teeth 18 of the feed comb 7 engage with the expended tool 11' in the lengthwise guide track 10'. The rearward withdrawal movement of the coulisse component part 23 begins in this position, until the tool 11' has reached the position shown in FIG. 5e, and the strip 27 and journal 25 are situated as depicted in FIG. 5e. Note that the strip 27 has already been displaced to the left. At the beginning of the next forward stroke, the stop comb 4 and the feed comb 7 are shifted to the right in a corresponding manner (FIG. 5a and 5'a), so that the tools 11 can be shoved forward. It is recognized from the movement cycle shown in FIGS. 5a to 5e that the tools 11 and 11' taken up in lengthwise guide tracks 10 and 10' are actually separated from each other by the comb teeth of the stop comb 4 or the feed comb 7 and are kept in their mutual correlation. Although a lengthwise movement and a transverse movement must be carried out, a simple lengthwise movement drive suffices by the piston-cylinder unit 24, since the transverse shift of the strip 27 takes place automatically at the end of the lengthwise stroke. As noted earlier, the magazine 4 comprises a self-contained unit which can be removed from the fixture 2, thereby uncoupling the stop comb and feed comb from the drive mechanism 23, 24. With the exchange of tool magazines 1, the uncoupling of the drive offers no difficulties, because only the drive journals 19 and 25 must be removed from (or inserted into) the pertinent openings of the coulisse constructional part 23.

For alignment and fastening of the tool magazine 1 in the magazine fixture 2, the tool magazine 1 is provided with displaced journals 32, which extend into the corresponding bore holes of the magazine fixture 2 and are locked there.

Figure 6:
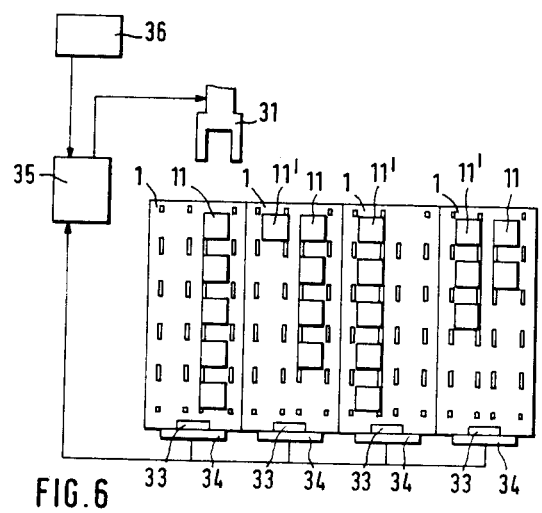
FIG. 6 is a schematic representation of several tool magazines in a tool machine, whereby a part of the control belonging to it is shown in a block wiring diagram.

FIG. 6 shows a simplified version of the arrangement of several tool magazines 1 on one tool machine. Each tool magazine 1 carries several similar tools 11. It is schematically indicated in FIG. 6 that each tool magazine 1 exhibits a code carrier 33, which for example, bears a coding mechanically or magnetically (in a manner not more specifically described here), which contains information concerning the type of tools 11 carried. The coding carriers 33 are scanned by a coding reader 34 arranged on the magazine mounting place (e.g., fixture 2) of the tool machine, which supplies the magazine coding, and which thus constitutes a tool coding, to a recoding mechanism 35. Information is provided by the tool coding required for the actual machining process from a control device 36 of the tool machine to a recoding mechanism 35. The recoding mechanism 35 gives a commond to the control mechanism of the tool gripping device 31 to move to that magazine mounting place (e.g., fixture 2) of the tool machine, whereby the corresponding tool coding is read by the coding reader 34. Regardless of the arrangement in which the tool magazine 1 is used, the tool gripping machine 31 finds a tool there with the properties designated by the control device 36.

To increase the magazine storage capacity, two or more tool magazines 1 can be arranged directly behind each other. The drive of the trailing tool magazine 1 can take place from the piston cylinder unit 24 of the first tool magazine 1, whose piston rods are then connected with several additional coulisse component parts 23. The exchange of the tools 11, 11' takes place between the individual tool magazines 1 in a simple manner by shoving over.

Instead of only the same tools in one tool magazine, different tools can also be housed in the same magazine, whereby information is stored about this in the control, which tools are found at which place in the tool magazine.

In the case of one-track design of the tool magazine 1 for tools 11, a common guiding back of the expended tools 11' can be provided for.

The magazine fixtures 2 can also be movable on the tool machine, for example they can be mounted movably or swivelably, in order to bring the actually necessary magazine 1 into the transfer position for the tool gripping device 31.

Instead of tools 11 or in addition to these, measuring elements can be housed in the tool magazines.

Figure 7:
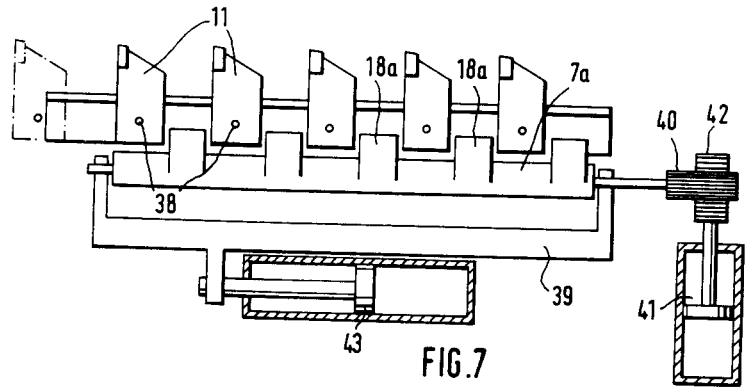
Figure 8:
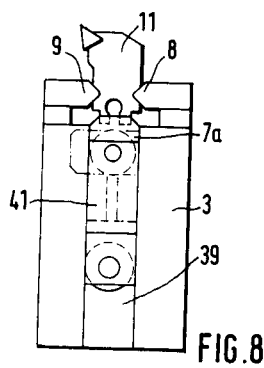

In the case of the embodiment according to FIGS. 7 and 8, as in the case of the following design examples, the tools 11 are provided with lateral rest bore holes 38 in which engage stop ball bearings (not shown), fixed in a spring-loaded manner in the guide rails 8, 9. By means of these rest mechanisms, the tools 11 are held in their positions with pre-established spacing intervals, when the teeth of the feed comb is out of engagement with the tools. In the case of the design according to FIGS. 7 and 8, the feed comb 7a is designed as a camshaft, which is mounted in a swivable manner in a sliding carriage 39 longitudinally movable in the foundation 3 of the tool magazine. The comb teeth 18a form the cams of the camshaft and engage in the shown meshing position between the individual tools 11. The feed comb 7a is connected with a pinion 40 which can be driven by a piston-cylinder unit 41 over a toothed rack 42 in a 90° rotational position.

A piston-cylinder unit 43 drives the sliding carriage 39 in a lengthwise movement, whereby the comb teeth 18a in engagement with the tools 11 move the tools 11 further by one step. At the end of the feed movement, the comb teeth 18a are rotated out of engagement with the tools 11 into the rotational position shown in dashed lines in FIG. 8. The sliding carriage 39 moves back to its starting position in which the comb teeth 18a are again rotated into engagement with tools 11. In the case of a tool magazine, which receives expended tools 11', the movement cycle takes place in reverse direction.

Figure 10:
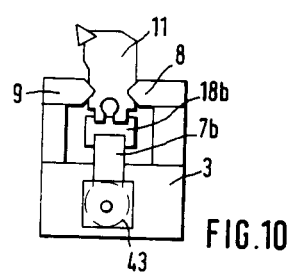
Figure 9:
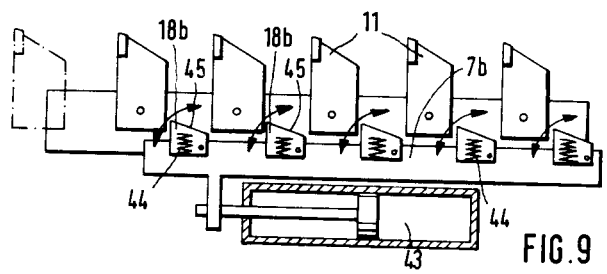

In the case of the example according to FIGS. 9 and 10, a feed comb 7b which can be shifted lengthwise in the tool magazine, is driven by the piston-cylinder unit arranged in the tool magazine. The comb teeth 18b are designed as ratchets fixed in an individually rotatable manner on the feed comb 7b, which is actually pressed by pressure spring 44 into the position engaging behind tool 11. The comb teeth 18b actually exhibit a rearward declining abutting surface 45 for the tools 11. With the withdrawal movement of the feed comb 7b, the comb teeth 18b are pressed down by tools 11 and due to this, glide past tools 11, without taking them along. The rotatable comb teeth 18b are arranged in opposite direction in the tool magazines to take-up the expended tools 11'.

In contrast to the design examples according to FIGS. 7 to 10, the design according to FIGS. 11 and 12, has a piston-cylinder unit (for carrying out the feed movement) arranged not on each individual tool magazine, but only on at least one of several magazine fixture places of the tool machine, namely, wherever a transfer or taking over of tools 11 and 11' should take place. Thus, one piston-cylinder unit services a plurality of fixtures.

The feed comb 7c is mounted movably and spring-loaded in lengthwise and transverse direction. The comb teeth 18c are connected rigidly with the feed comb 7c and on their upper side exhibit an abutting surface 46 for the tools 11 inclined in a common direction.

A carrier 47 supporting the piston-cylinder unit 43 can be lifted by a piston-cylinder unit 48, in order to bring the drive journal 49 into mesh with the feed comb 7c, so that the piston-cylinder unit 43 can drive the feed comb 7c to a feed movement, whereby the comb teeth 18c take along the tools 11. At the end of the feed movement, the carrier 47 is drawn down by the piston-cylinder unit 48 so that the drive journal 49 is uncoupled. The comb teeth 18c and thus the feed comb 7c are moved downward by pressure springs 51 out of engagement with the tools 11. Under the effect of pressuring spring 50, the feed comb 7c slides back into its original position.

Similar to the case of the design example according to FIGS. 11 and 12, in the case of the example according to FIGS. 13 and 14, a common drive mechanism is provided for feeding the tools 11 into the tool magazine only on individual magazine fixture points of the tool machine. In this case as well, the piston-cylinder unit 43 is movable vertically by the piston-cylinder unit 48. In contrast to the previously described example, however, the cylinder unit 43 is directly connected with the feed comb 7d, while the individual tool magazines no longer exhibit a feed comb. The comb teeth 18d rigidly connected with the feed comb 7d enter into engagement with the tools 11 and 11', when the carrier 47 is lifted by the piston-cylinder unit 48. In this position, the piston-cylinder unit 43 carries out a feed movement, at the end of which the feed comb 7d is again moved downwardly, in order to carry out its withdrawal movement out of engagement with the tools 11.

It is recognized from FIG. 14 that several tool magazines 1 are arranged next to each other on a common magazine sliding carriage, which can be shifted transverse to magazine's lengthwise direction, in order to bring the desired tool magazine into the feed position over the feed comb 7d.

It is also recognized from FIG. 14 that a tool magazine for expended tools 11' is arranged in the middle of the magazine sliding carriage 52. There are tool magazines for new tools 11 on both sides of it.

In the base 3 of the tool magazine according to FIGS. 15 and 16, an endless, drivable feed chain 53 is mounted as a feed comb, which is engaged with cams 54 engaging between the tools 11 and 11'.

In the case of the design example according to FIGS. 13 and 14, the removable tool magazine is essentially formed only of a framework unit taking-up both oppositely lying guide rails 8, 9 or 8', 9' of the lengthwise guide tracks 10 and 10', while all component parts necessary for feed are found on a tool machine fixture. A special design of this tool magazine consisting of a frame unit is shown in FIGS. 17 and 18. In this, both guide rails 8, 9 are connected with each other by a gantry 55 engaging over the tools 11. The gantry, which is reverse U in cross-section 55 simultaneously protects tools 11. The feed drive of the tools 11 carried by one tool magazine according to FIGS. 17 and 18 takes place for example in the way explained in FIGS. 13 and 14 by comb teeth 18d of a feed comb 7d. Here also, the tools are kept at a given distance from each other by spring-loaded rest mechanisms, whereby the rest mechanisms can engage either in rest openings of the tools or in the intermediate spaces between the tools 11.

Although the invention has been described in connection with preferred embodiments thereof, it will be appreciated by those skilled in the art that additions, deletions, modifications, and substitutions may be made, without departing from the spirit or scope of the invention as defined in the appended claims.

What is claimed is:

1. In a tool machine of the type comprising at least one tool magazine which removably carries a plurality of tools, and a tool gripping device which grips tools individually from the magazine and transports them to a tool fixture of the machine, the improvement wherein:
a magazine fixture is provided, said magazine comprising a self-contained unit which is removably mounted on said magazine fixture,
said magazine and said magazine fixture being provided with interengageable means for aligning and fastening said tool magazine on said magazine fixture,
said magazine including a guide track which mounts a plurality of tools for movement in the lengthwise direction of said guide track, and
feeding means mounted on said magazine fixture and being arranged for shifting all of said tools in said guide track at the same time, said feeding means comprising at least one feed comb including comb teeth configured and arranged to drivingly engage said tools, said feed comb being movable transverse to the lengthwise direction of said guide track to bring said teeth into and out of said driving engagement with said tools, said feed comb being movable in the lengthwise direction of said guide track to shift said teeth.

2. Apparatus according to claim 1, wherein said magazine includes a code carrier identifying said tools, a coding element mounted on said carrying fixture and arranged to detect said code carrier, and a control mechanism connected to said coding element for receiving signals identifying said tools.

3. Apparatus according to claim 1 including a stop comb in said magazine, said stop comb being movable transversely but not lengthwise in said guide track and including stop teeth movable into and out of engagement with said tools, when in engagement with said tools said stop teeth preventing lengthwise movement thereof.

4. Apparatus according to claim 3, wherein said feed comb and stop comb move simultaneously in the transverse direction.

5. Apparatus according to claim 4, wherein said magazine includes a base mounted in said fixture, said stop comb being mounted in said base and movable transversely relative thereto, said feed comb being mounted in said stop comb and movable lengthwise relative thereto.

6. Apparatus according to claim 1, wherein said magazine includes two parallel guide tracks.

7. Apparatus according to claim 6, wherein said feed comb and said stop comb each contain teeth which alternately engage tools in said two guide tracks.

8. Apparatus according to claim 3, wherein said feeding means comprises a pair of drive journals which connect with said feed comb and stdp comb, respectively, and project from said magazine, and a drive mechanism on said fixture to which said journals are operably connected.

9. Apparatus according to claim 8, wherein said drive mechanism comprises a coulisse part which is displaceable in the lengthwise direction and which includes a transversely wide groove in which the drive journal of the stop comb projects, a slide valve mounted in said coulisse part and including a deflecting strip projecting into said groove, said drive journal of said stop comb being displaceable transversely in said groove by said deflecting strip to move said teeth of said stop comb.

10. Apparatus according to claim 9 including means for shifting said deflecting strip transversely in response to said coulisse part reaching either end of its stroke.

11. Apparatus according to claim 1, wherein there are a plurality of parallel guide tracks each including opposite guide rails which engage guide grooves in said tools.

12. Apparatus according to claim 11, wherein said guide grooves and guide rails have V-shaped cross-sections.

13. Apparatus according to claim 11, wherein at least one rail of each guide track can be shifted transversely against a return spring bias.

14. Apparatus according to claim 11, wherein said gripping device includes gripper rails engageable with said guide grooves of said tools.

15. Apparatus according to claim 14, wherein both guide grooves of each tool include a depression in which a projection of said gripper rail may engage to releasably hold said tool.

16. Apparatus according to claim 11, wherein both said opposite guide rails are provided on said magazine.

17. Apparatus according to claim 16, wherein both guide rails are interconnected by a gantry overlying said tools.

18. Apparatus according to claim 1, wherein there are a plurality of said magazine mounted for replacement on said fixture.

19. Apparatus according to claim 1, wherein said feed comb is mounted for rotation about a lengthwise action to move the teeth thereof into and from engagement relative to said tools.

20. Apparatus according to claim 1, wherein said teeth of said feed comb are rotatably mounted against a return spring bias, said last-named teeth including inclined cam follower surfaces.

21. Apparatus according to claim 1, wherein said feed comb is spring biased in the transverse and lengthwise directions in said magazine, said teeth of said feed comb including inclined cam-follower surfaces.

22. Apparatus according to claim 1, wherein said fixture includes a plurality of magazine receiving locations and said feeding means at least at one of said locations, said feeding means comprising a lengthwise shiftable feed comb which is also transversely shiftable such that teeth thereof are engageable in spaces between said tools.

23. Apparatus according to claim 1, wherein said feeding means includes a feed chain having a portion traveling in the lengthwise direction of said guide track, said chain including pusher cams engaging in spaces between said tools.

24. In a tool machine of the type comprising at least one tool magazine which removably carries a plurality of tools, and a tool gripping device which grips tools individually from the magazine and transports them to a tool fixture of the machine, the improvement wherein:

a magazine fixture is provided, said magazine comprising a self-contained unit which is removably mounted on said magazine fixture, said magazine and said magazine fixture being provided with interengageable means for aligning and fastening said tool magazine on said magazine fixture, said magazine including guide track means which mounts a plurality of tools for movement in the lengthwise direction of said guide track means, and feeding means mounted on said magazine fixture and being arranged for shifting all of said tools in said guide track means at the same time, said guide track means comprising a plurality of parallel guide tracks each including opposite guide rails which engage guide grooves in said tools, said gripping device including gripping rails engageable with said guide grooves of said tools.

25. In a tool machine of the type comprising at least one tool magazine which removably carries a plurality of tools, and a tool gripping device which grips tools individually from the magazine and transports them to a tool fixture of the machine, the improvement wherein:

a magazine fixture is provided, said magazine comprising a self-contained unit which is removably mounted on said magazine fixture, said magazine and said magazine fixture being provided with interengageable means for aligning and fastening said tool magazine on said magazine fixture, said magazine including a guide track which mounts a plurality of tools for movement in the lengthwise direction of said guide track, and feeding means mounted on said magazine fixture and being arranged for shifting all of said tools in said guide track at the same time, said fixture including a plurality of magazine receiving locations and said feeding means being disposed at least at one of said locations, said feeding means comprising a lengthwise shiftable feed comb which is also transversely shiftable such that teeth thereof are engageable in spaces between said tools.

26. In a tool machine of the type comprising at least one tool magazine which removably carries a plurality of tools, and a tool gripping device which grips tools individually from the magazine and transports them to a tool fixture of the machine, the improvement wherein:

a magazine fixture is provided, said magazine comprising a self-contained unit which is removably mounted on said magazine fixture, said magazine and said magazine fixture being provided with interengageable means for aligning and fastening said tool magazine on said magazine fixture, said magazine including a guide track which mounts a plurality of tools for movement in the lengthwise direction of said guide track, and feeding means being mounted on said magazine fixture and being arranged for shifting all of said tools in said guide track at the same time, said feeding means including a feed chain having a portion traveling in the lengthwise direction of said guide track, said chain including pusher cams engaging in spaces between said tools.

* * * * *